(12) United States Patent
Sato et al.

(10) Patent No.: US 8,743,089 B2
(45) Date of Patent: Jun. 3, 2014

(54) INFORMATION PROCESSING APPARATUS AND CONTROL METHOD THEREOF

(75) Inventors: Hajime Sato, Yokohama (JP); Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 13/176,783

(22) Filed: Jul. 6, 2011

(65) Prior Publication Data

US 2012/0019485 A1     Jan. 26, 2012

(30) Foreign Application Priority Data

Jul. 26, 2010 (JP) ................................ 2010-167477

(51) Int. Cl.
    *G06F 3/042*      (2006.01)

(52) U.S. Cl.
    USPC .......................................... 345/175; 345/158

(58) Field of Classification Search
    CPC ...... G06F 3/042; G06F 3/0425; G06F 3/0386
    USPC .................. 345/173–179, 156, 158
    See application file for complete search history.

(56) References Cited

U.S. PATENT DOCUMENTS

| | | | |
|---|---|---|---|
| 4,782,399 A | 11/1988 | Sato | |
| 4,953,114 A | 8/1990 | Sato | |
| 5,384,900 A | 1/1995 | Sato et al. | |
| 5,570,115 A | 10/1996 | Kawai et al. | |
| 6,580,806 B1 | 6/2003 | Sato | |
| 6,606,636 B1 | 8/2003 | Okazaki et al. | |
| 6,740,860 B2 | 5/2004 | Kobayashi | |
| 7,158,117 B2 | 1/2007 | Sato et al. | |
| 7,312,795 B2 | 12/2007 | Aso et al. | |
| 7,519,223 B2 * | 4/2009 | Dehlin et al. | ................ 382/203 |
| 2005/0052427 A1 | 3/2005 | Wu et al. | |
| 2011/0164003 A1 | 7/2011 | Kobayashi | |

FOREIGN PATENT DOCUMENTS

| | | |
|---|---|---|
| JP | 2005-100391 | 4/2005 |
| JP | 3997392 | 8/2007 |
| JP | 4221330 | 11/2008 |

* cited by examiner

*Primary Examiner* — Andrew Sasinowski
(74) *Attorney, Agent, or Firm* — Fitzpatrick, Cella, Harper & Scinto (57) ABSTRACT

According to the present invention, even if a plurality of operators perform gesture operations in three-dimensional space, the three-dimensional spatial gesture of each operator is accurately associated with the target object of the three-dimensional spatial gesture. For this, a projector displays at least one selection-target object on an upper surface of a table. When a pointer operated by an operator comes in contact with the upper surface of the table, a two-dimensional coordinate detecting apparatus detects the contact position, and determines which object has been designated by the operator. In this stage, among pointers detected by a three-dimensional coordinate detecting apparatus, a pointer having a position closest to the contact position is determined, and the pointer determined to be the closest is decided as a tracking target. Thereafter, the tracking-target pointer is tracked by the three-dimensional coordinate detecting apparatus to determine the operator's gesture pattern.

10 Claims, 8 Drawing Sheets

INFORMATION PROCESSING APPARATUS AND CONTROL METHOD THEREOF

BACKGROUND OF THE INVENTION

1. Field of the Invention

The present invention relates to a technique for performing processing, which corresponds to a user's gesture in three-dimensional space.

2. Description of the Related Art

Conventionally, coordinate input apparatuses that employ various methods have been proposed and put into production. Among them, touch panels are widely used, as they only require a user's finger touch on a display screen and require no special device. A positional detection method employed by this type of apparatus includes a resistive film method, an electrostatic capacity method, an ultrasonic wave method utilizing surface acoustic waves, an optical method, and the like. In a resistive film method, for instance, a change in a resistance value is measured when a finger or the like depresses a plurality of sheets where transparent electrodes are planted, and the depressed position is calculated. Since position calculation is performed by measuring the physical change caused by depression, in other words, a contact with the sheet, it is possible to not only calculate the position, but also determine with high precision whether or not the finger or the like is contacting the sheet. Similarly, an electrostatic capacity method and a surface acoustic wave method, which perform position calculation by measuring changes in the physical state of a sheet, are capable of detecting a contact with high precision. Furthermore, an input apparatus capable of detecting a plurality of pointer positions has also become known, as disclosed by Japanese Patent Laid-Open No. 2005-100391.

Meanwhile, a three-dimensional position detecting apparatus capable of detecting a position in space is also known. There is a so-called stereo camera, which can detect an object's three-dimensional shape or an object's position by viewing a common visual field area from a plurality of directions using a plurality of cameras. Further known is a range image sensor having cells in a matrix form for capturing a two-dimensional image, and radiating infrared ray for timing the infrared light reflected by an object in units of cell. Since this apparatus can calculate a distance to a reflection object in units of cell, it can detect an object's three-dimensional shape or an object's position.

With the use of an apparatus of this type, which can detect an object's three-dimensional shape or an object's position, it is possible to detect palm movement or motion, e.g., flipping of a palm, in three-dimensional space. By detecting such motion, it is possible to, for instance, move or rotate an object displayed on a display apparatus. In other words, based on an output result of an apparatus of this type, it is possible to control a PC. Hereinafter, an operation in three-dimensional space will be referred to as a "three-dimensional spatial gesture." Moreover, detecting a three-dimensional spatial gesture and executing processing corresponding to the gesture will be referred to as a "three-dimensional spatial gesture function."

For instance, Japanese Patent No. 3997392 discloses image input means which detects human motions, separation means which separates physical motions into a plurality of motion parts, and motion information output means which outputs motion information for each of the motion parts. The document teaches that, by analyzing each of the motion information outputs, it is possible to perform display control using three-dimensional spatial gesture.

Furthermore, Japanese Patent No. 4221330 discloses a user interface for three-dimensionally pointing a target object. More specifically, spatially-divided virtual boxes are arranged in advance by weighting, and based on images which are detected continuously in terms of time, a box designated by a user can be specified.

However, in an apparatus capable of detecting an object's three-dimensional shape or an object's position, the shape detection or position detection includes an error. A problem to be solved in terms of this error is now described with reference to FIGS. 7A and 7B.

Figure 7A:
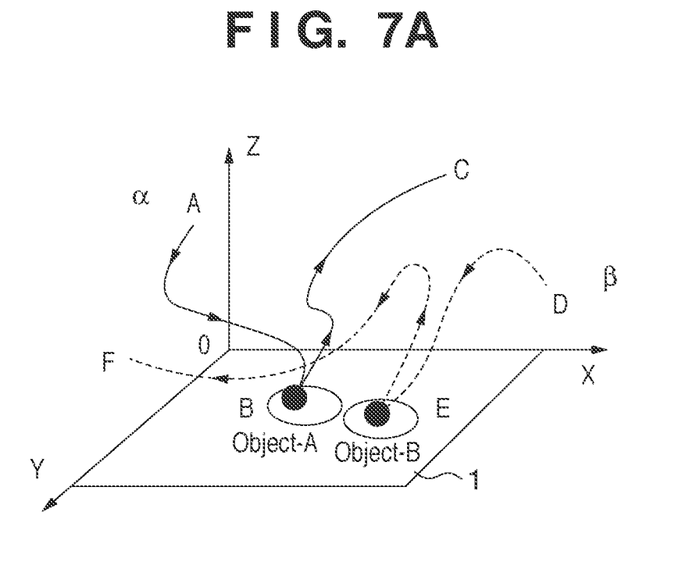
FIGS. 7A and 7B are explanatory views of the problem to be solved.

In FIG. 7A, assume that a XY plane is a display surface of a display apparatus. Also assume that a three-dimensional coordinate detecting apparatus can detect a position in a spatial coordinate system defined by X, Y and Z axes.

Assume that operator α touches (selects) displayed Object-A by an operation in the three-dimensional space. Because of the aforementioned measurement error, the three-dimensional coordinate detecting apparatus cannot accurately determine whether or not operator α has touched Object-A on the display surface. In other words, despite the operation performed near Object-A on the display surface, the detecting apparatus is unable to precisely determine whether or not the operator's motion is contact.

Meanwhile, the operator judges that he/she has actually selected the displayed object at the moment his/her fingertip touches the display surface. This can be confirmed by the feel of the operator's fingertip. It is never the moment the fingertip nears the displayed object. If the operator's fingertip nears the displayed object and the detecting apparatus erroneously judges that it was touched, then, an operation contrary to the operator's intention, in other words, an erroneous operation is performed. This considerably deteriorates operability.

Figure 7B:
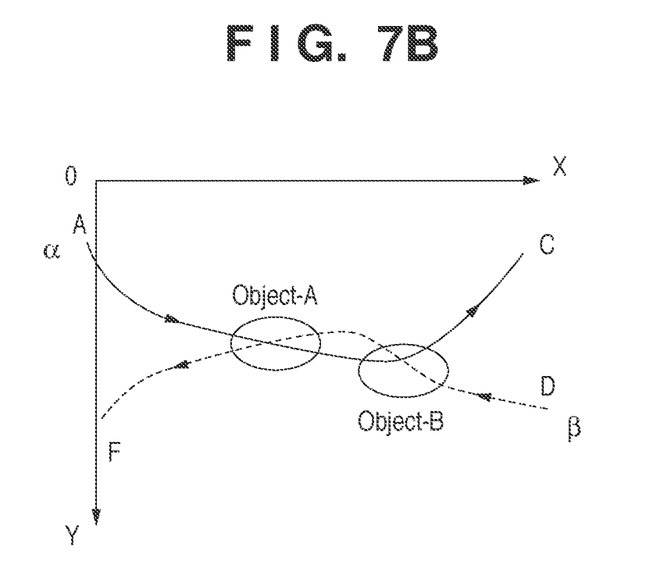

Similarly, FIG. 7A shows motions in the case where operator β selects Object-B. It is also difficult to accurately determine whether or not operator β has touched Object-B. FIG. 7B shows the motion seen from the Z-axis. Both operators α and β pass above Object-A and Object-B. Therefore, if the touch determination includes an error, erroneous detection, such as, selection of Object-A by operator β, may occur contrary to the operator's intention.

SUMMARY OF THE INVENTION

The present invention has been made to solve the above-described problem. According to the technique provided by the present invention, even if a plurality of operators perform gesture operations in three-dimensional space, the three-dimensional spatial gesture of each operator is accurately associated with a target object of the three-dimensional spatial gesture, and erroneous processing on a wrong object is prevented.

In order to solve the above-described problem, for example, the present invention in its aspect provides an information processing apparatus comprising: a display unit configured to display at least one selection-target object on a display screen; a first detecting unit configured to detect a contact position of an operator's pointer on a display area of the object; a second detecting unit configured to detect a three-dimensional position of a candidate of the operator's pointer in space above the display screen of the display area; and a determining unit configured to, when the first detecting unit detects a contact position on the display area, determine a candidate pointer which is close to the contact position, detected by the second detecting unit, as a pointer for designating processing on the object.

According to the present invention, a processing-target object can be designated accurately, and the object can be associated with a gesture indicative of a processing content with high precision. Accordingly, even if a plurality of operators perform operations, it is possible to accurately specify a target object operated by each of the operators, and adequately reflect the operator's intention.

Further features of the present invention will become apparent from the following description of exemplary embodiments with reference to the attached drawings.

DESCRIPTION OF THE EMBODIMENTS

Preferred embodiments of the present invention are now described in detail with reference to the accompanying drawings. Note that configurations shown in the following embodiments are merely an example, and the present invention should not be limited to the configurations shown in the drawings.

First Embodiment

Figure 1:
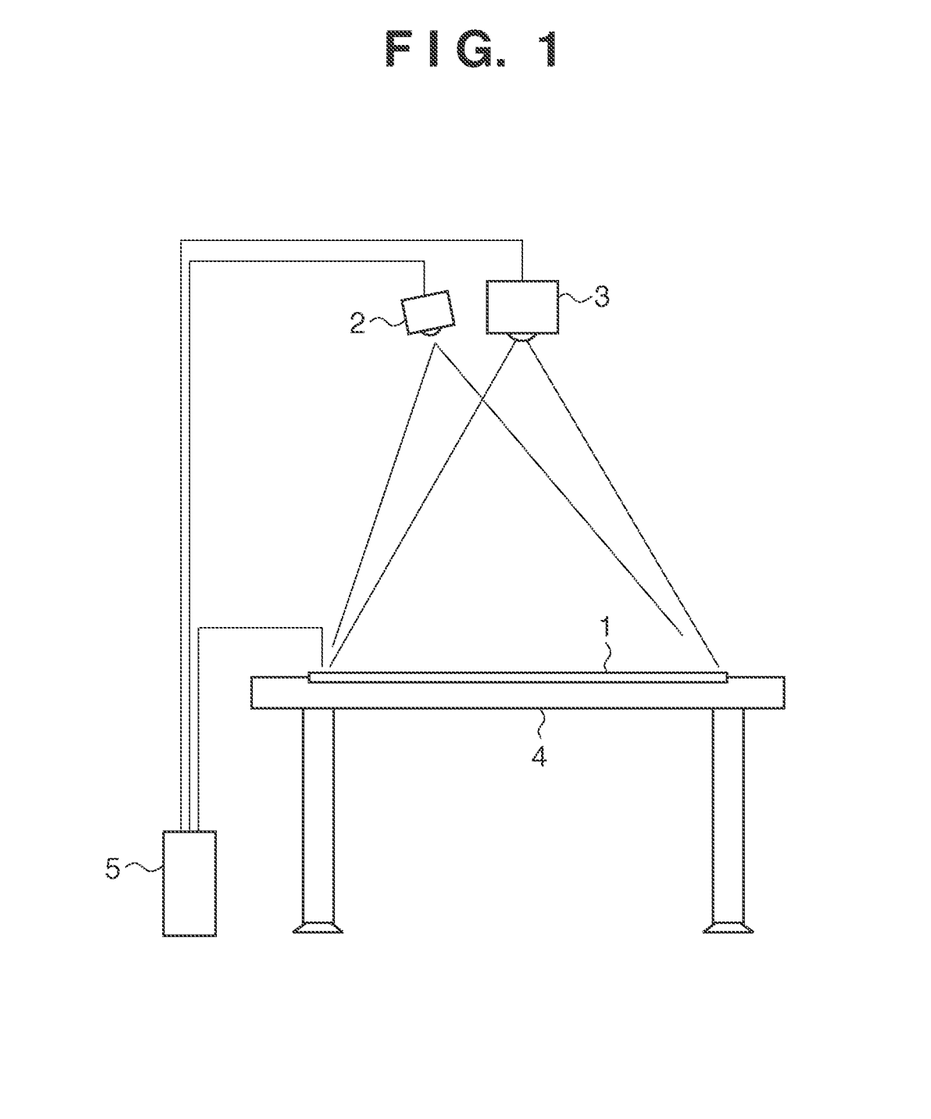
FIG. 1 is a schematic view of an apparatus according to an embodiment of the present invention.

FIG. 1 shows a schematic view of an information processing apparatus according to the present invention. Although the apparatus according to the present embodiment will become apparent from the following description, the apparatus comprises a construction for displaying at least one selection-target object in a display area having a two-dimensional plane, and a construction serving as the first detecting means for detecting a two-dimensional contact position of a pointer operated by an operator, which is corresponding to the display area, as well as a construction serving as the second detecting means for detecting a three-dimensional position of the pointer, operated by the operator, in the space including a direction perpendicular to the display surface of the display area. By controlling them, the apparatus accurately detects an object intended by a three-dimensional gesture. The following description provides an example.

The apparatus according to the present embodiment comprises: a table 4 serving as a working table for an operator; a projector 3, which is fixed to a position away from the upper surface of the table 4 by a predetermined distance, and which serves as a display apparatus for projecting an image on a display area; a two-dimensional coordinate detecting apparatus 1 (first detecting unit) which uses the display area as an input area and detects a contact position of an operator's pointer (finger); a three-dimensional coordinate detecting apparatus 2 (second detecting unit) which detects a three-dimensional spatial gesture of an operator's pointer; and a host computer 5 which controls the above components.

The two-dimensional coordinate detecting apparatus 1 only needs to discriminate whether one of the selection-target objects is selected by a pointer, which is operated by an operator, from a displayed menu or the like. Therefore, it may adopt any of the resistive film method, electrostatic capacity method, ultrasonic wave method utilizing surface acoustic waves, or optical method. Further, the two-dimensional coordinate detecting apparatus 1 is capable of simultaneously detecting a match of a plurality of touches.

The three-dimensional coordinate detecting apparatus 2 may adopt any method as long as it can follow and detect an operator's pointing position in three-dimensional space (gesture detection). In the present embodiment, assume that a three-dimensional image range detecting apparatus is employed as the three-dimensional coordinate detecting apparatus 2. Further assume that the three-dimensional coordinate detecting apparatus 2 is capable of detecting a plurality of coordinates simultaneously. It is so arranged that the display area of the projector 3 is included in the detection range of the three-dimensional coordinate detecting apparatus 2, which is provided as the three-dimensional image range detecting apparatus. The three-dimensional image range detecting apparatus 2 is configured to time infrared ray reflected by a target object, so as to obtain a distance from the apparatus to the object. Sensors for detecting the distance are arranged in a matrix form, so that the distance can be measured independently in units of sensor, enabling measurement of an object's three-dimensional position or an object's shape without any contact. In addition, continuous image sensing enables the apparatus to track movement of an object. However, the three-dimensional coordinate detecting apparatus 2 cannot detect an object displayed on the table 4. More specifically, the three-dimensional coordinate detecting apparatus 2 can only measure the shape of the display surface (a planar shape in case of a flat panel display, or a curved shape in case of a CRT display).

Note that although the embodiments of the present invention use the projector 3 as a display device, a flat panel display, such as a LCD, may be used. In this case, a transparent two-dimensional coordinate detecting apparatus 1 is superimposed on the display surface of the flat panel display. Also, the three-dimensional coordinate detecting apparatus 2 is not limited to the above-described image range detecting apparatus employing infrared ray, but it may utilize a stereo camera or the like for detecting a position or motion of an object.

Furthermore, although the following descriptions are given assuming that the host computer 5 processes outputs of the two-dimensional coordinate detecting apparatus 1 and three-dimensional coordinate detecting apparatus 2, an embodiment may be configured in a way that, for instance, an output of the two-dimensional coordinate detecting apparatus 1 is directly outputted to the three-dimensional coordinate detecting apparatus 2. Moreover, in the following descriptions, assume that the coordinate input surface which serves as a display surface of the display device (projection surface) is XY plane, and the normal direction of the XY plane is Z-axis.

Figure 2A:
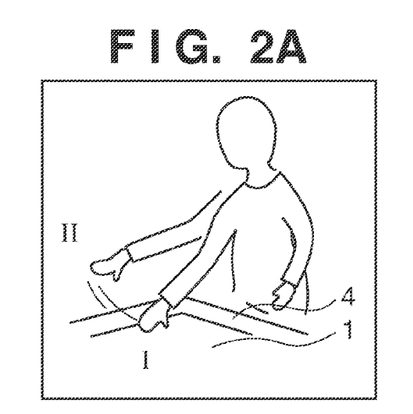
FIGS. 2A to 2D are explanatory views showing an example of operation and gesture.
Figure 2B:
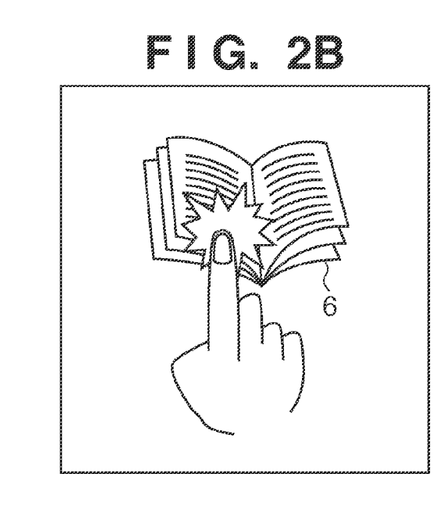
Figure 2C:
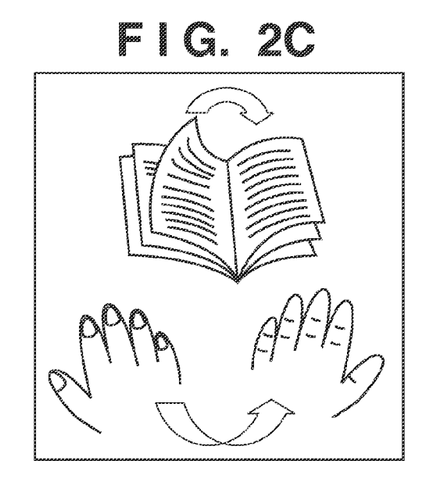
Figure 2D:
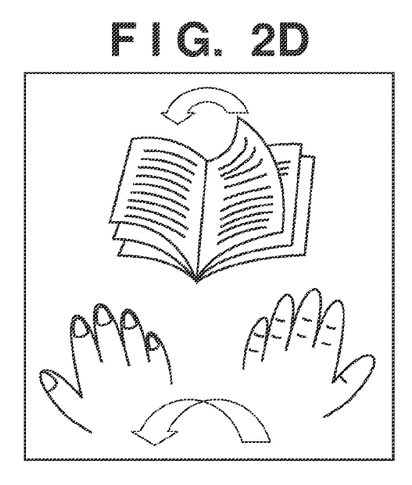

With reference to FIGS. 2A to 2D, an example of operator's operation is described. Assume that an operator is reading a "book" displayed on the screen. Normally, a person who is reading a physical book turns a page when he/she finishes reading the page. In the present embodiment, this motion is detected as a gesture. In accordance with the detected gesture, display control for page turning is performed. First, a target object is selected by touching a book (object) displayed on the screen (FIG. 2B). When an operator flips the back of his/her hand, he/she can turn the page (FIG. 2C). When he/she wants to return to the previous page, he/she flips the palm of his/her hand, thereby returning to the previous page (FIG. 2D). Therefore, the state in FIG. 2B, in which the operator's hand is touching the display surface, corresponds to the state I in FIG. 2A. Flipping the back of his/her hand (FIG. 2C) or flipping the palm of his/her hand (FIG. 2D) corresponds to the state II (in the air) in FIG. 2A.

As mentioned before, there is always an error in distance measurement performed by the three-dimensional coordinate detecting apparatus 2 of this type. Therefore, it is difficult for the three-dimensional coordinate detecting apparatus 2 to accurately determine whether or not the operator has touched the display surface. On the contrary, since the two-dimensional coordinate detecting apparatus 1 detects coordinates of a touched position by being touched, it can accurately determine whether or not the operator has touched the display surface. However, the position detectable area is limited to the display surface, and thus the two-dimensional coordinate detecting apparatus 1 cannot detect position coordinates in the air.

Therefore, according to the present invention, functions and features of the two-dimensional coordinate detecting apparatus 1 and three-dimensional coordinate detecting apparatus 2 are combined to realize the control by the object selection and spatial gesture shown in FIGS. 2A to 2D. As can be seen in the page-turning operation in FIGS. 2A to 2D, by virtue of using a spatial gesture, this invention can provide intuitive operability with a natural motion.

Figure 3A:
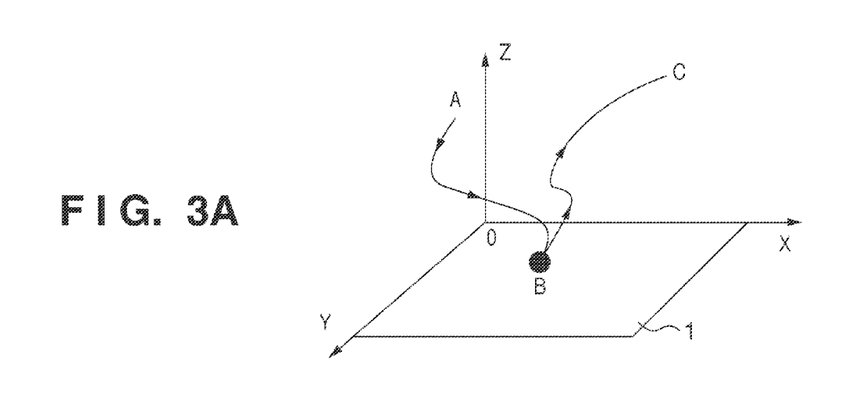
FIG. 3A is an explanatory view showing an example of gesture.
Figure 3B:
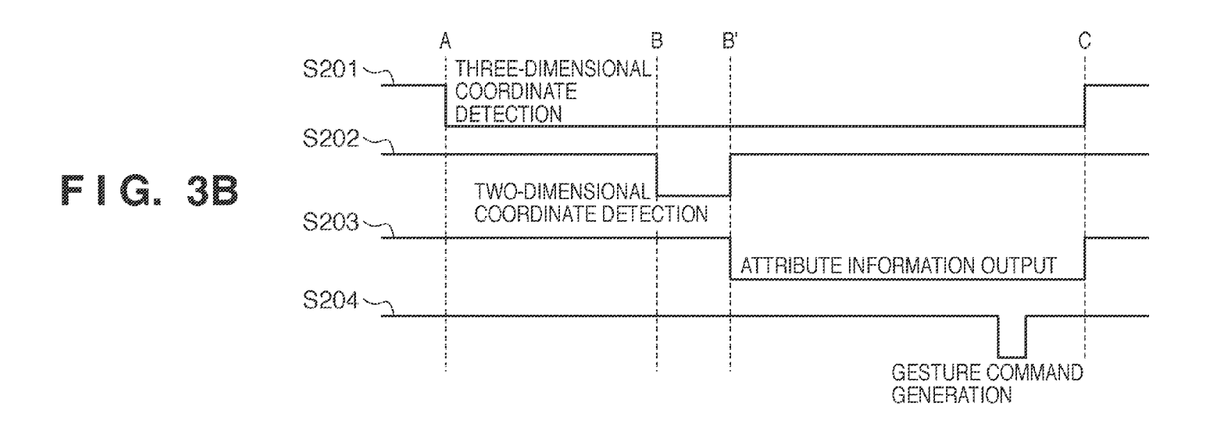
FIG. 3B is a timing chart of gesture.

With reference to FIGS. 3A and 3B, an operation of the two-dimensional coordinate detecting apparatus 1 and three-dimensional coordinate detecting apparatus 2 is described.

FIG. 3A is an explanatory view of an operator's motion. Assume that an operator holds up his/her palm at point A in the XYZ coordinate system for selecting a displayed object. More specifically, at point A, when an operator's palm comes into the measurement visual field of the three-dimensional coordinate detecting apparatus 2, the three-dimensional coordinate detecting apparatus 2 starts measuring the palm position. To select a displayed object, the operator touches the display surface at point B. At point C, the operator's palm goes out of the measurement visual field, and the palm position measurement ends.

FIG. 3B is a timing chart describing operation of the two-dimensional coordinate detecting apparatus 1 and three-dimensional coordinate detecting apparatus 2 at this time. Signal S201 indicates that the three-dimensional coordinate detecting apparatus 2 starts three-dimensional position measurement when the palm is at point A, and ends the measurement when the palm is at point C.

Signal S202 indicates that the two-dimensional coordinate detecting apparatus 1 first outputs position coordinates when the operator touches the display surface at point B, and continues outputting only during the duration of the touch. Upon ending the output, control is performed for displaying a state, which indicates that the object displayed at the touched position has been selected (for instance, the touched object is flashed on and off). Then, processing is performed for associating the touched object with the user's gesture (stroke in the three-dimensional space) of which three-dimensional coordinates have been detected. The associating processing will be referred to as attribute information generation processing. Management of the attribute information is performed by the host computer which controls a displayed image.

While the two-dimensional coordinate detecting apparatus 1 is outputting touched position information (signal S202), the three-dimensional coordinate detecting apparatus 2 is also detecting three-dimensional coordinates (signal S201). Although it is difficult to determine an operator's touch based on an output result of the three-dimensional coordinate detecting apparatus 2, it is possible to detect, based on the detected coordinate value, the palm's two-dimensional position (XY coordinates) and the fact that the palm is positioned near the display surface. Therefore, by comparison between both the detected coordinate values, attribute information (information indicative of the touched object) generated based on the result of the two-dimensional coordinate detecting apparatus 1 can be turned over to the output coordinate value of the three-dimensional coordinate detecting apparatus 2. As a result, after the two-dimensional coordinate detecting apparatus 1 completes outputting, the coordinates outputted by the three-dimensional coordinate detecting apparatus 2 will have the generated attribute information.

Assume that a plurality of inputs are simultaneously received as shown in FIGS. 7A and 7B. When operator α moves his/her palm from point A to point B, no attribute information is given to the output coordinate value of the three-dimensional coordinate detecting apparatus 2. Similarly, no attribute information is given to the output coordinate value of the three-dimensional coordinate detecting apparatus 2 when operator β moves his/her palm from point D to point E. The outputs of the three-dimensional coordinate detecting apparatus 2 include palm position information of operators α and β.

When operator α touches the display surface at point B, the output of the two-dimensional coordinate detecting apparatus 1 is compared with the output of the three-dimensional coordinate detecting apparatus 2 which will be detected immediately after the touch. Naturally, among the two position coordinates (X, Y, Z) outputted by the three-dimensional coordinate detecting apparatus 2, the X-axis component and Y-axis component in one of the two position coordinates should be substantially equal to the coordinate values (X, Y) outputted by the two-dimensional coordinate detecting apparatus 1. Therefore, attribute information, indicating that Object-A has been touched, is given to the palm (in this case, operator α's palm) which is determined to be in the substantially equal position. Similarly, at point E and after this point, attribute information, indicating that Object-B has been touched, is given to the palm position information of operator β, which is outputted by the three-dimensional coordinate detecting apparatus 2. Even if operators α and β touch the display surface simultaneously, attribute information can accurately be given by comparison of the position information.

As has been described above, even in a case where the two-dimensional coordinate detecting apparatus 1 and the three-dimensional coordinate detecting apparatus 2 detect positions of a plurality of objects, attribute information will not be given erroneously because the coordinate values outputted by the apparatuses 1 and 2 as well as the coordinate output timings are compared. Therefore, it is possible to provide highly reliable operation environment. Particularly in a case of such operation performed on a table as in the present invention, in which a plurality of operators surrounding the table are expected to operate simultaneously, this invention can provide operation environment that allows smooth collaborative work.

A description is now provided referring back to FIGS. 3A and 3B. Attribute information generated by touching the target object is associated with coordinate information outputted by the three-dimensional coordinate detecting apparatus 2. The attribute information becomes valid only during the time the three dimensional coordinate detecting apparatus 2 is continuously outputting coordinates of the target palm (signal S203). The host computer 5 makes analysis of three-dimensional coordinates outputted by the three-dimensional coordinate detecting apparatus 2, to which the attribute information is added, or a three-dimensional output image, recognizes the gesture such as palm flipping, and generates a corresponding gesture command (signal S204). By virtue of the above-described configuration, a plurality of operators can respectively perform operations, such as that shown in FIGS. 2A to 2D, on each of their target objects.

Further, during the period when attribute information is not provided (period between A and B' of signal S201), since image analysis for command generation is not performed, it is possible to reduce processing load on the host computer 5. In addition, the amount of accumulation of the output coordinate information can be reduced, and thus the memory capacity can be made small. Details thereof will be described later.

Figure 8A:
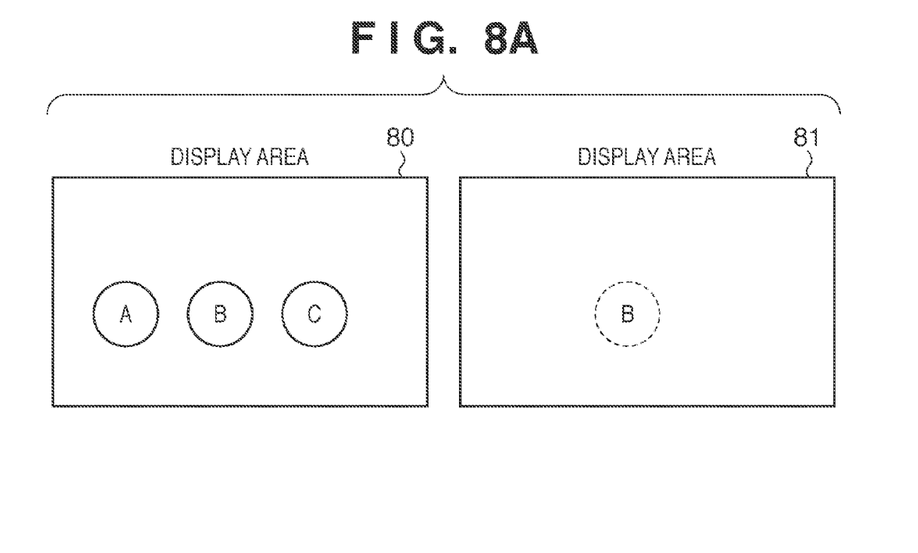
FIGS. 8A and 8B are explanatory views of an effect of the invention.
Figure 8B:
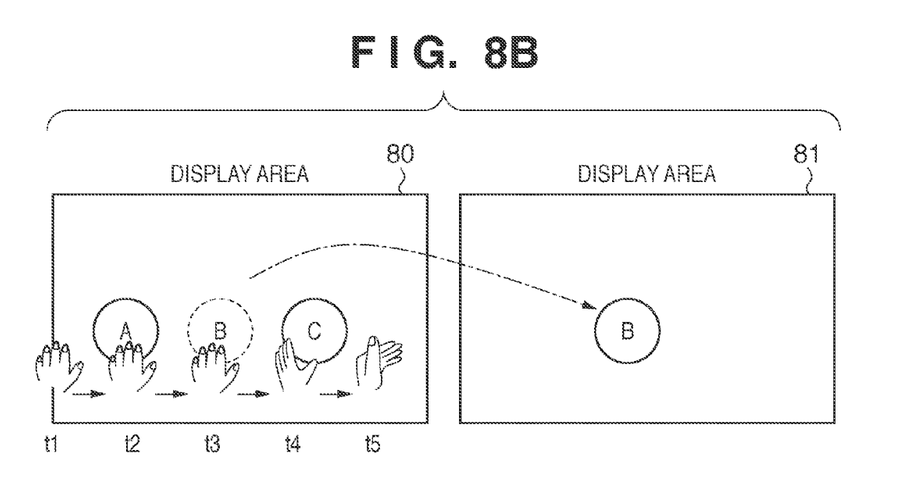

FIGS. 8A and 8B are explanatory views describing one of the effects attained by the configuration of the present embodiment. As shown in FIG. 8A, assume that objects A, B, and C are displayed in the display area 80, and that an operator wants to move the object B to the display area 81.

FIG. 8B shows a palm's locus detected by the three-dimensional coordinate detecting apparatus 2, or hand image information. At time t1, the three-dimensional coordinate detecting apparatus 2 starts detecting the operator's palm. Assume that the operator's palm passes above the object A (t2), and is positioned near the object B at time t3. The two-dimensional coordinate detecting apparatus 1 detects the palm's touch at time t3, calculates the touched position, makes the object B into a selection state, and thereafter, associates the palm's motion (gesture), which is detected by the three-dimensional coordinate detecting apparatus 2, with the object B. Since this association is performed by comparing an output result of the two-dimensional coordinate detecting apparatus 1 with an output result of the three-dimensional coordinate detecting apparatus 2, even if a plurality of palms have been detected by the three-dimensional coordinate detecting apparatus 2, the object is associated with one of the palms for certain. From time t4 to t5, a wrist twist motion is detected (command recognition), and a control signal for moving the object B to the next display area 81 is generated. As a result of command recognition, the display of the object B is moved from the display area 80 to the display area 81.

During the time t1 to t3, since association is not made between the object and the pointer detected by the three-dimensional coordinate detecting apparatus 2, tracking means is not performing operation for spatial gesture recognition. Therefore, no influence is exerted on any of the objects' display or motion. By touching the object, association is made between the object and the pointer detected by the three-dimensional coordinate detecting apparatus 2, and thereafter, the operation is shifted to spatial gesture recognition. Therefore, output information of the two-dimensional coordinate detecting apparatus 1 serves as a trigger signal for starting the spatial gesture recognition. This prevents execution of unnecessary recognition processing, and enables command generation based on a highly reliable spatial gesture.

Conventionally, in a case of supplying some type of control signal to an object with the use of spatial gesture of this type, the target object needs to be selected in advance. More specifically, an object must be selected with a pointing device, e.g., a mouse, and thereafter an operation must be performed on the object by spatial gesture. In this regard, it should be noted that the configuration of the present embodiment enables an operator to realize operation by a single series of motion, as shown in FIG. 8B, and enables intuitive operation, thereby achieving beneficial effect and significant improvement in operability.

Figure 4:
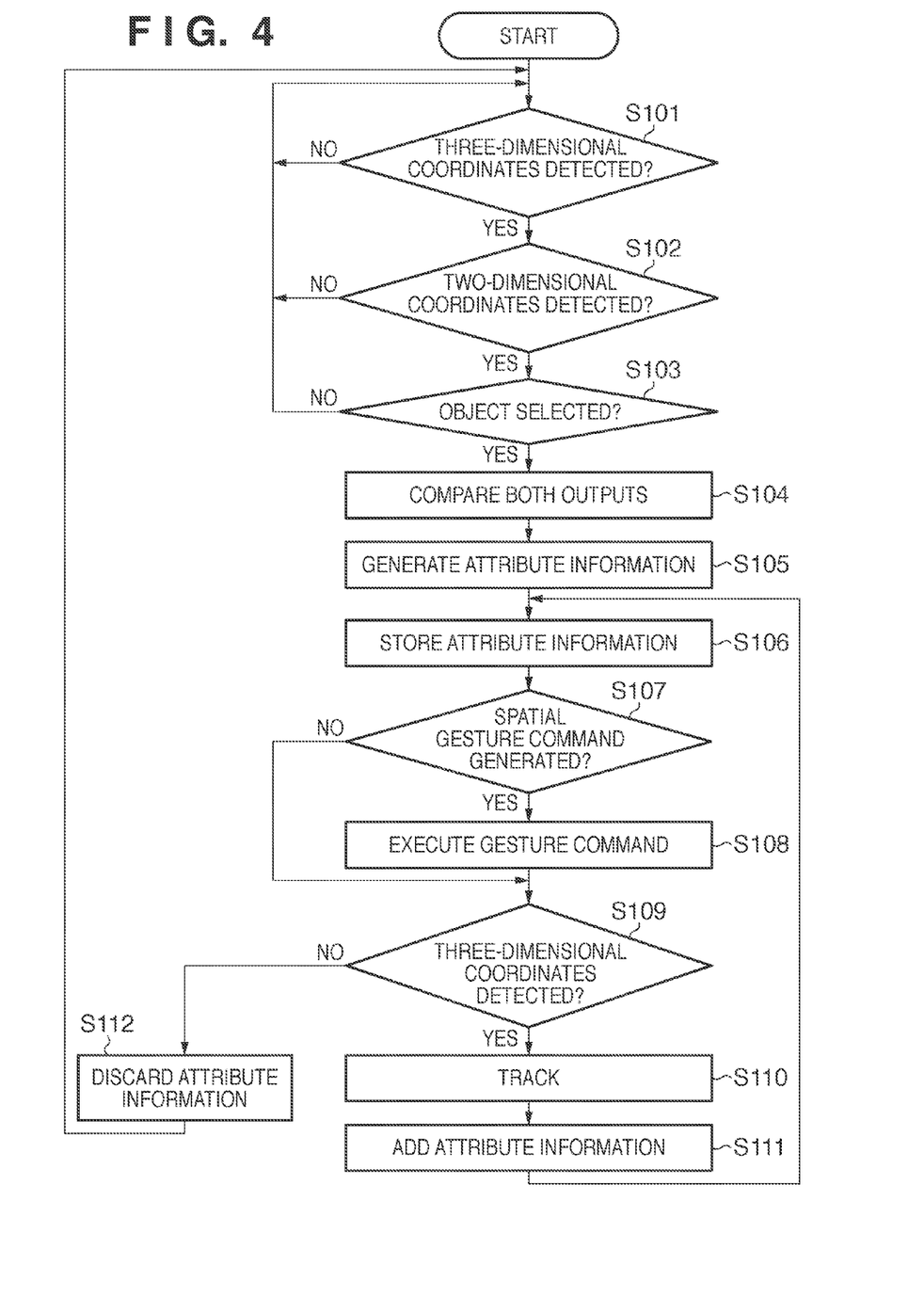
FIG. 4 is a flowchart describing processing according to the embodiment.

FIG. 4 is a flowchart describing a series of processing of the host computer 5 according to the present embodiment. In S101, it is determined whether or not an output is acquired from the three-dimensional coordinate detecting apparatus 2. If an object is detected, then it is determined in S102 whether or not an output is acquired from the two-dimensional coordinate detecting apparatus 1. When an output is acquired from the two-dimensional coordinate detecting apparatus 1, it is determined whether or not there is an object displayed at the detected position, in other words, it is determined whether or not an operator has made a motion for object selection (S103). In the case of object selection, in S104, an output of the three-dimensional coordinate detecting apparatus 2 is compared with an output of the two-dimensional coordinate detecting apparatus 1. Then, among the output results of the three-dimensional coordinate detecting apparatus 2, an output that meets the condition (for instance, position information of the pointer, such as a finger or pen, or the shape thereof) is decided.

In the present invention, position information outputted by each of the detecting units are compared, and the association is made in accordance with the position information coincidence. More specifically, when an operator touches an object (S102), the object is selected (S103). Outputs of the three-dimensional coordinate detecting apparatus 2, which have been detected virtually simultaneously (S101), are compared (matching) with position information outputted in step S102 (S104). As a result, among the position information outputted by the three-dimensional coordinate detecting apparatus 2, an output value which most agrees with the condition is selected (decided). In S105, the object-specifying information which has been selected in S103 is associated with the output value selected from the outputs of the three-dimensional coordinate detecting apparatus 2 (attribute information generation). In S106, the attribute information and the output result of the three-dimensional coordinate detecting apparatus 2 are stored.

In S107, it is determined whether the coordinate data string which is being tracked among the outputs of the three-dimensional coordinate detecting apparatus 2, which have been accumulated in S106, coincides with any of the pre-registered gesture patterns, with the use of, for instance, pattern recognition in image processing. When it is regarded that there is a coincided pattern, a three-dimensional spatial gesture command corresponding to the pattern is generated. When a three-dimensional spatial gesture command is generated, the command is executed on the selected object based on the stored attribute information (S108). In S109, an output of the three-dimensional coordinate detecting apparatus 2 is captured. Meanwhile, if a gesture command is not generated in S107, then an output of the three-dimensional coordinate detecting apparatus 2 is captured in S109. If there is an output from the three-dimensional coordinate detecting apparatus 2 in S109, then in S110, the output result is compared with the output result of the three-dimensional coordinate detecting apparatus 2 which has already been stored in S106. In this manner, it is possible to track changes in the specified output value in the sampling.

In S111, the object information of the specified output value is associated with the changes in the specified output value obtained as a result of tracking, namely, position information. Then, the associated information and the output result of the three-dimensional coordinate detecting apparatus 2 are stored in S106. Therefore, the information stored in S106 includes the target object associated with the tracking information of the specified output value. Based on these accumulated tracking information, a gesture command is generated in S107 using patter recognition or the like.

If it is determined in S107 that a predetermined gesture command has been generated, a control assigned to the command is executed on the associated object (S108). In a case of gesture command generation, the tracking information stored in S106 alone may be deleted. However, even in this case, the specified output value which will continuously be detected is still tracked, object association is similarly performed again in S110 and S111, and the track of the specified output value is stored. The data is used again for spatial gesture command generation.

While the above-described routine (S106, S107, S109, S110, and S111) is being executed, if an output from the three-dimensional coordinate detecting apparatus 2 is no longer detected in S109, in other words, if the operator's pointer moves out of the detection range of the three-dimensional coordinate detecting apparatus 2, the control proceeds to S112. In S112, in order to remove the target operator's pointer from the tracking target, the attribute information is discarded or the information which has been stored in S106 is discarded, and the control returns to S101.

As can be seen from the above-described flow, while an output of the two-dimensional coordinate detecting apparatus 1 serves as an analysis-start trigger for gesture command generation (S102), an output of the three-dimensional coordinate detecting apparatus 2 serves as a cancel trigger of the analysis (S109).

In a case where the three-dimensional coordinate detecting apparatus 2 detects a plurality of pointers (a state in which a plurality of output signals are generated by the three-dimensional coordinate detecting apparatus 2), the above-described operation and association are performed respectively for each of the pointers.

Note that, in the above-described embodiment, the attribute information is discarded when the determination in S109 is NO, in other words, when three-dimensional coordinates are no longer detected after gesture command execution. However, the embodiment may be configured in a way that the attribute information is discarded at the time of gesture command execution. In this case, the control may proceed from S108 to S112 without further processing.

Second Embodiment

In the first embodiment, the host computer 5 receives outputs from the two-dimensional coordinate detecting apparatus 1 and three-dimensional coordinate detecting apparatus 2, controls and manages the outputs to achieve the objective. However, an embodiment is not limited to this; for instance, an embodiment may be configured in a way that the three-dimensional coordinate detecting apparatus 2 receives an output result from the two-dimensional coordinate detecting apparatus 1. More specifically, it may be configured in a way that, when the three-dimensional coordinate detecting apparatus 2 receives, from the two-dimensional coordinate detecting apparatus 1, an output result of coordinates which have been detected based on user's touch on the two-dimensional area (display surface), the three-dimensional coordinate detecting apparatus 2 compares an output result of itself with the received coordinates (three-dimensional coordinate data having 0 as a Z-axis value) or performs analysis, and generates attribute information and a gesture command to be outputted to the host computer 5.

Third Embodiment

In the first embodiment, an analysis-start trigger for gesture command generation is an output of the two-dimensional coordinate detecting apparatus 1, and a cancel trigger of the analysis is an output of the three-dimensional coordinate detecting apparatus 2. However, an embodiment is not limited to this; for instance, a certain object (cancel object) may be displayed in the display area for enforcing cancellation.

Figure 5:
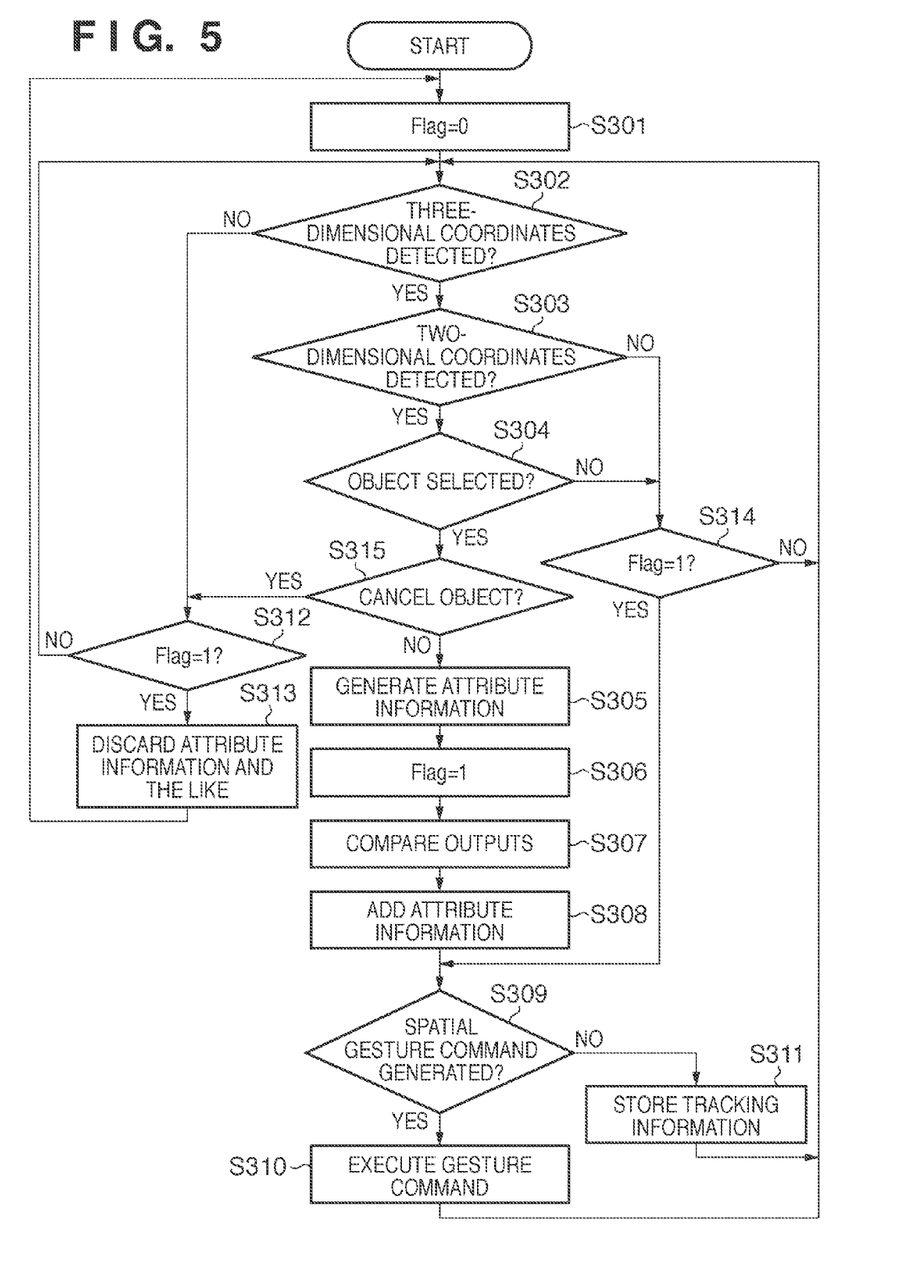
FIG. 5 is a flowchart describing processing according to the third embodiment.

Processing in this case is described with reference to FIG. 5. In S301, Flag=0 is set for initialization. In S302, it is determined whether or not an output is acquired from the three-dimensional coordinate detecting apparatus 2. If no object is detected by the three-dimensional coordinate detecting apparatus 2, it is determined whether or not Flag=1 stands (S312). In a case of Flag=0, the control returns to three-dimensional coordinate detection by the three-dimensional coordinate detecting apparatus 2. In a case of Flag=1, as will be apparent from the following description, the attribute information is discarded (S313), and the control returns to S301 to reset the Flag to an initial value.

Meanwhile, if it is determined in S302 that an output is acquired from the three-dimensional coordinate detecting apparatus 2, then it is determined in S303 whether or not an output is acquired from the two-dimensional coordinate detecting apparatus 1. An output acquisition from the two-dimensional coordinate detecting apparatus 1 means an operator's touch on the display surface. Therefore, it is determined whether or not an object has been selected (S304). When it is determined that an object selection operation is made, it is determined whether or not the selected object is a cancel object (S315). When it is determined that it is a cancel object, the control proceeds to S312. More specifically, when the operator designates a cancel object, the processing similar to the case of moving operator's hand out of the three-dimensional coordinate detection region is performed.

Meanwhile, if it is determined that the selected object is an object other than the cancel object, attribute information corresponding to the selected object is generated (S305), and Flag=1 is set (S306). Among the three-dimensional coordinates (at least one coordinate data should exist) that have been detected in S303, the closest three-dimensional coordinate data to the two-dimensional coordinate data (or three-dimensional coordinate data having 0 as a Z-axis value), which has been detected in S302, is specified (S307). The generated attribute information is added to the specified three-dimensional coordinate data (the designated object is associated with the three-dimensional coordinate data), thereby setting the coordinate data, which will thereafter continuously be detected, as a tracking target for gesture determination (S308).

In S309, pattern matching or the like is performed between the three-dimensional coordinate data string, to which the attribute information has been added, and pre-registered gesture patterns, thereby determining whether or not predetermined gesture command generation has successfully been performed. If NO, it means that not enough number of three-dimensional coordinate data has been stored; therefore, storing of the output data from the three-dimensional coordinate detecting apparatus 2 continues in S311. Then, the control returns to S302 to monitor outputs from the three-dimensional coordinate detecting apparatus 2. If it is determined in S309 that a spatial gesture command is generated, the command is executed on the associated object in S310.

According to the above-described configuration, during execution of the coordinate tracking processing (the state of Flag=1), if an operator realizes, for instance, that he/she has selected a wrong object, the operator can cancel the selection by simply designating (touching) the cancel object displayed on the display surface. Note that, in the state of Flag=1, assume that, when an operator designates the cancel object, not only the attribute information is discarded but also the accumulated three-dimensional coordinate data are deleted.

As has been described above, according to the third embodiment, attribute information can be discarded even if an operator does not move his/her palm out of the visual field of the three-dimensional coordinate detecting apparatus 2 (in other words, an output of the three-dimensional coordinate detecting apparatus 2 is no longer detected); therefore, the operability is improved.

Fourth Embodiment

Figure 6:
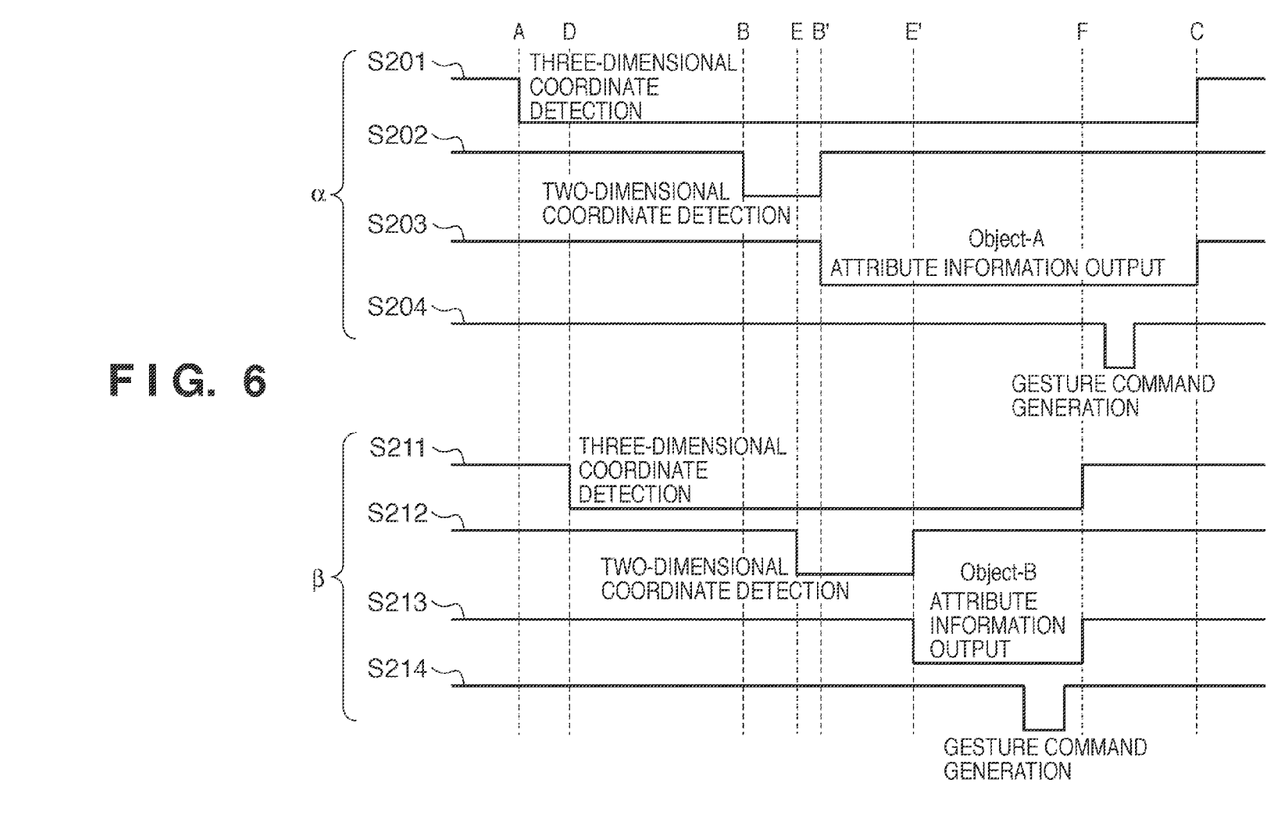
FIG. 6 is a timing chart in a case where a plurality of inputs are received.

FIG. 6 is a timing chart in a case where a plurality of operators perform operations as in FIGS. 7A and 7B. In the drawing, since signals S201 to S204 are the same as the signals in FIG. 3B, descriptions thereof are omitted.

The three-dimensional coordinate detecting apparatus 2 starts outputting a signal at timing A, and starts another outputting at timing D. It means that there are two target objects to be monitored. The object's shape as well as position are outputted with respect to each of the target objects. The two-dimensional coordinate detecting apparatus 1 starts outputting a signal by detecting a touch of operator α at timing B, and also detects a touch of operator β at timing E. The apparatus 1 outputs two pointing position coordinates during the period from B to E'.

The coordinates outputted by the two-dimensional coordinate detecting apparatus 1 at timing B must be distinguished as to whether the data is from the signal S201 or from the signal S211, which are outputted by the three-dimensional coordinate detecting apparatus 2. In the present embodiment, the two-dimensional coordinate detecting apparatus 1 calculates coordinates on the XY plane which serves as the display surface, while the three-dimensional coordinate detecting apparatus 2 calculates coordinates in the XYZ space, including the XY plane. Therefore, coordinates can be distinguished by conforming both the coordinate systems. More specifically, coordinates (x2, y2, z2) outputted by the three-dimensional coordinate detecting apparatus 2 are compared with coordinates (x1, y1) outputted by the two-dimensional coordinate detecting apparatus 1, and a signal having substantially equal X-axis coordinate value and Y-axis coordinate value is selected. Based on the coordinate coincidence as mentioned above, it is possible to determine that the detected motion outputted by the signal S202 of the two-dimensional coordinate detecting apparatus 1 is from the signal S201 outputted by the three-dimensional coordinate detecting apparatus 2. Furthermore, since it is possible to discriminate that Object-A has been touched based on the output signal from the two-dimensional coordinate detecting apparatus 1, the signal S201 is associated with the attribute information, Object-A.

The three-dimensional coordinate detecting apparatus 2 takes samples at predetermined intervals, so that it can track changes in position information of the aforementioned selected pointer. Accordingly, the association between the pointer and an object can be retained.

Similarly, the signal S212 outputted by the two-dimensional coordinate detecting apparatus 1 is associated with the signal S211 outputted by the three-dimensional coordinate detecting apparatus 2, and the signal S211 is associated with attribute information, Object-B. Since attribute information are given to the signals S201 and S211, an analysis for gesture command detection is performed, and gesture commands are generated respectively (signals S204 and S214).

Fifth Embodiment

In the foregoing embodiments, descriptions have been provided with the two-dimensional coordinate detecting apparatus 1 employing a resistive film method, and a three-dimensional image range sensor serving as the three-dimensional coordinate detecting apparatus 2. However, this invention is not limited to this. More specifically, the two-dimensional coordinate detecting apparatus may employ an electrostatic capacity method, an ultrasonic wave method utilizing surface acoustic waves, or an optical method.

Moreover, for a three-dimensional coordinate detecting apparatus, ordinary camera means for taking photographs or the like, or video means may be used. Naturally, it cannot determine whether or not an operator has touched the input surface as shown in FIG. 2B. In this case, the camera is placed next to the projector 3 as shown in FIG. 1. Images outputted by the camera are two-dimensional data. Therefore, it is possible to detect a position or direction of a hand in the sensed image, or which direction a hand has moved chronologically. After a touch on the object is detected, if an operator's hand moves out of the image sensing angle of the camera, it can simply be removed from the tracking target.

Accordingly, as described above, by associating an object, which is selected based on an output result of the two-dimensional coordinate detecting apparatus, with an output coordinate value of the three-dimensional coordinate detecting apparatus, a similar effect can be achieved.

Sixth Embodiment

Although the above-described embodiments have used a position coordinate value as an output of the three-dimensional coordinate detecting apparatus, the present invention is not limited to this.

If an operation shown in FIGS. 2C and 2D is to be sensed by a camera, it is possible to determine palm flipping or the like, or whether the object in FIG. 2B is touched with one finger or two fingers. By determining such state based on sensed images of the camera, a command may be generated. More specifically, in FIG. 2C, page turning may be executed when the second detecting unit determines that the hand's position has been moved from left to right, or that the back of the hand has been flipped. Alternatively, a command may be generated by synthesizing both signals.

Seventh Embodiment

In the foregoing embodiments, coordinates which are acquired simultaneously from the two-dimensional coordinate detecting apparatus and three-dimensional coordinate detecting apparatus are compared, or an output of the two-dimensional coordinate detecting apparatus is compared with an output of the three-dimensional coordinate detecting apparatus, which is acquired immediately after the two-dimensional coordinate output acquisition. Then, among the output results of the three-dimensional coordinate detecting apparatus, one that coincides with the position information of the two-dimensional coordinate detecting apparatus (or one having the closest position information) is selected, and the object information is given.

However, the information is not limited to position information; for instance, if image sensing means, such as an ordinary camera, is to be used instead of a three-dimensional coordinate detecting apparatus, the image sensing means would output an image. Therefore, if an operation such as FIGS. 7A and 7B is performed, the image should include two operators' hands (or arms) and two objects. Assume that an output is acquired from the two-dimensional coordinate detecting apparatus and that Object-A is selected. In an output image of the image sensing means obtained immediately after the object selection, at least one of the hands should be placed on or near Object-A. In other words, using the output of the two-dimensional coordinate input means as a trigger, it is possible to discriminate which hand is touching Object-A based on the image of the image sensing means which is obtained immediately after the object selection. In other words, Object-A can be associated with the hand information detected by the image sensing means.

As is apparent from the above-described embodiments, attribute information, such as an object selected by an operator's touch, can be associated with a value detected by the second position detecting means. Therefore, even if a plurality of operators perform operations, the target object operated by each of the operators can accurately be specified, and operator's intention can be reflected appropriately. Furthermore, presence or absence of attribute information can help determine whether or not a series of coordinate values outputted by coordinate tracking means indicate an operation for spatial gesture command generation, and as a result, erroneous operation and processing time can considerably be reduced. Moreover, it is possible to achieve beneficial effect in that an operation for selecting a necessary object from a plurality of target objects and an operation for reflecting operator's intention on the object are realized by a single series of motion and are achieved intuitively.

Other Embodiments

Although preferred embodiments have been described above, the present invention may be realized in the form of, e.g., a system, apparatus, method, program, or recording medium (storage medium). More specifically, the invention may be applied to a system constituted by a plurality of devices (for instance, host computer, interface unit, image sensing apparatus, web application and so on), or to an apparatus comprising a single device.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-167477, filed Jul. 26, 2010, which is hereby incorporated by reference herein in its entirety.

What is claimed is:

1. An information processing apparatus comprising:
a display unit configured to display an object on a display screen;
a first detecting unit configured to detect a two-dimensional contact position of an operator's pointer on the display screen;
a second detecting unit configured to detect a three-dimensional position of the operator's pointer in three-dimensional space above the display screen; and
a control device coupled with said display unit, said first detection unit and said second detection unit,
wherein said control device
causes said display unit to display at least one selectable object on the display screen;
specifies, when said first detecting unit detects contact on the display screen, an object selected by the operator's pointer based on the two-dimensional contact position detected by said first detecting unit, and
determines, among pointers in the three-dimensional space detected by said second detecting unit, one pointer which is closest to the two-dimensional contact position detected by said first detecting unit, as a pointer to be tracked by said second detecting unit for determining a three-dimensional gesture for designating processing on the specified object.

2. The apparatus according to claim 1,
wherein said control device determines a three-dimensional gesture pattern of the determined operator's pointer based on sequential three-dimensional coordinate data comprising three components obtained by tracking the determined pointer using said second detecting unit, and executes processing corresponding to the discriminated three-dimensional gesture pattern on the specified object.

3. The apparatus according to claim 2,
wherein, in a case where the determined pointer moves out of a detecting area of said second detecting unit, said control device resets the pointer as not being a pointer for designating processing on the object.

4. The apparatus according to claim 1, wherein said second detecting unit is provided at a position away from a two-dimensional plane of the display screen by a predetermined distance, and is a three-dimensional image range detecting unit having at least the display screen within an image sensing angle.

5. An information processing apparatus comprising:
a display unit configured to display an object on a display screen;
a first detecting unit configured to detect a two-dimensional contact position of an operator's pointer on the display screen;
a second detecting unit, provided at least at a position spaced from a two-dimensional plane of the display screen by a predetermined distance, configured to consecutively detect three-dimensional images in which each pixel represents a distance between said second detecting unit and an object in the three dimensional space above the display screen to detect a three-dimensional gesture of at least one operator's pointer in the three dimensional space; and
a control device coupled with said display unit, said first detecting unit, and said second detecting unit,
wherein said control device causes said display unit to display at least one selectable object on the display screen;

specifies, when said first detecting unit detects contact on the display screen, an object selected by the operator's pointer based on the two-dimensional contact position detected by said first detecting unit, and determines, among pointers in the three-dimensional space detected by said second detecting unit, one pointer which is closest to the two-dimensional contact position, as a pointer to be tracked for determining a three-dimensional gesture for designating processing on the specified object.

6. The apparatus according to claim 5, wherein, in a case where the determined pointer moves out of a detecting area of said second detecting unit, said control device resets the pointer as not being a pointer for designating processing on the object.

7. A control method of an information processing apparatus having: a display unit configured to display an object on a display screen; a first detecting unit configured to detect a two-dimensional contact position of an operator's pointer on the display screen; and a second detecting unit configured to detect a three-dimensional position of the operator's pointer in three-dimensional space above the display screen, said method comprising the step of:

causing said display unit to display at least one selectable object on the display screen;

specifying, when said first detection unit detects contact on the display screen, an object selected by the operator's pointer based on the two-dimensional contact position detected by said first detecting unit, and determining, among pointers in the three-dimensional space detected by said second detecting unit, one pointer which is closest to the two-dimensional contact position detected by the first detecting unit, as a pointer to be tracked by said second detecting unit for determining a three-dimensional gesture for designating processing on the specified object.

8. A non-transitory computer-readable storage medium which stores a computer program for having a computer execute the method described in claim 7.

9. A control method of an information processing apparatus comprising: a display unit configured to display an object on a display screen; a first detecting unit configured to detect a two-dimensional contact position of an operator's pointer on the display screen; and a second detecting unit, provided at least at a position spaced from a two-dimensional plane of the display screen by a predetermined distance, configured to consecutively detect three-dimensional images in which each pixel represents a distance between said second detecting unit and an object in the three dimensional space above the display screen to detect a three-dimensional gesture of at least one operator's pointer in three-dimensional space, said method comprising the step of:

causing said display unit to display at least one selectable object on the display screen;

specifying, when said first detecting unit detects contact on the display screen, an object selected by the operator's pointer based on the two-dimensional contact position detected by said first detecting unit, and determining, among pointers in the three-dimensional space detected by said second detecting unit, one pointer which is closest to the two-dimensional contact position, as a pointer to be tracked for determining a three-dimensional gesture for designating processing on the specified object.

10. A non-transitory computer-readable storage medium which stores a computer program for having a computer execute the method described in claim 9.

* * * * *